(12) United States Patent
Vignali

(10) Patent No.: US 12,246,840 B2
(45) Date of Patent: Mar. 11, 2025

(54) RAM AIR COOLING TURBINE GENERATOR

(71) Applicant: Hamilton Sundstrand Corporation, Charlotte, NC (US)

(72) Inventor: Mark G. Vignali, Simsbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 254 days.

(21) Appl. No.: 17/863,018

(22) Filed: Jul. 12, 2022

(65) Prior Publication Data

US 2024/0017838 A1    Jan. 18, 2024

(51) Int. Cl.
B64D 13/08 (2006.01)
B64D 13/06 (2006.01)

(52) U.S. Cl.
CPC ............ B64D 13/08 (2013.01); B64D 13/06 (2013.01); B64D 2013/0603 (2013.01); B64D 2013/0644 (2013.01)

(58) Field of Classification Search
CPC .... B64D 2013/0648; B64D 2013/0618; B64D 41/007
See application file for complete search history.

(56) References Cited

U.S. PATENT DOCUMENTS

| 5,505,587 | A | 4/1996 | Ghetzler |
| 6,127,758 | A | 10/2000 | Murry et al. |
| 7,624,592 | B2 | 12/2009 | Lui et al. |
| 10,704,466 | B2 * | 7/2020 | Dierksmeier ............. F02C 7/14 |
| 10,752,375 | B2 | 8/2020 | Snyder |
| 2019/0234308 | A1 | 8/2019 | Dierksmeier |
| 2020/0346763 | A1 | 11/2020 | Defrancesco et al. |

OTHER PUBLICATIONS

Extended European Search Report and Written Opinion for European Application No. 23184195.8; Report Mail Date Nov. 17, 2023 (9 Pages).

* cited by examiner

Primary Examiner — Ana M Vazquez
(74) Attorney, Agent, or Firm — CANTOR COLBURN LLP

(57) ABSTRACT

A cooling system of a vehicle including an inlet for receiving a medium and a turbo-generator fluidly connected to the inlet. The turbo-generator includes a turbine operably coupled to a generator by a shaft. The turbine has a turbine inlet and a turbine outlet, the turbine inlet being fluidly coupled to the inlet. The medium is ram air.

14 Claims, 1 Drawing Sheet

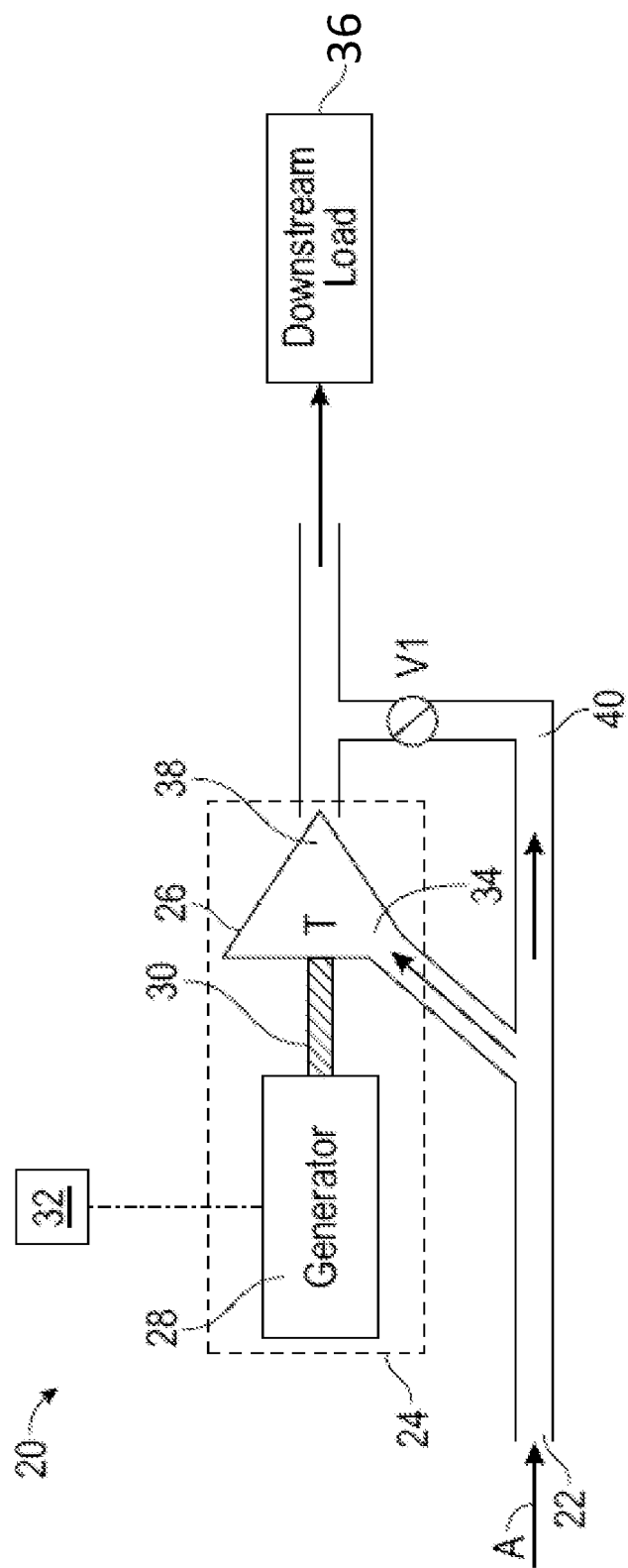

RAM AIR COOLING TURBINE GENERATOR

BACKGROUND

Exemplary embodiments pertain to the art of thermal management of and, in particular, to thermal management of one or more loads of a vehicle.

A typical commercial aircraft includes at least several nonintegrated cooling systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

One or more of these cooling systems may rely on ram or fresh air to condition, i.e., to cool or heat another medium. However, in applications where the aircraft is travelling at supersonic speeds, the temperature of the ram air may be too high to effectively remove heat from another load.

BRIEF DESCRIPTION

According to an embodiment, a cooling system of a vehicle including an inlet for receiving a medium and a turbo-generator fluidly connected to the inlet. The turbo-generator includes a turbine operably coupled to a generator by a shaft. The turbine has a turbine inlet and a turbine outlet, the turbine inlet being fluidly coupled to the inlet. The medium is ram air.

In addition to one or more of the features described above, or as an alternative, in further embodiments the turbine is directly connected to the inlet.

In addition to one or more of the features described above, or as an alternative, in further embodiments including at least one downstream component fluidly coupled to the turbine outlet, wherein the medium is configured as a heat sink at the at least one downstream component.

In addition to one or more of the features described above, or as an alternative, in further embodiments the at least one downstream component includes an environmental control system including a ram air circuit having at least one heat exchanger.

In addition to one or more of the features described above, or as an alternative, in further embodiment including a bypass conduit extending from the inlet to downstream of the turbine outlet and a valve associated with the bypass conduit.

In addition to one or more of the features described above, or as an alternative, in further embodiments the cooling system is operable in a first mode and a second mode, the valve being closed in the first mode, and the valve being at least partially open in the second mode.

In addition to one or more of the features described above, or as an alternative, in further embodiments the generator is electrically coupled to at least one load of the vehicle.

In addition to one or more of the features described above, or as an alternative, in further embodiments the vehicle is an aircraft.

In addition to one or more of the features described above, or as an alternative, in further embodiments the vehicle is operable in a supersonic cruise condition.

According to an embodiment, a method of operating a cooling system of a vehicle includes receiving a medium at an inlet, expanding the medium within a turbine to create an expanded medium that is output from a turbine outlet, and creating electricity at a generator in response to expanding the medium within the turbine. The medium is ram air and the turbine is fluidly coupled to the inlet.

In addition to one or more of the features described above, or as an alternative, in further embodiments including providing the medium directly from the inlet to the turbine.

In addition to one or more of the features described above, or as an alternative, in further embodiments including providing the expanded medium to at least one downstream component, the expanded medium being configured as a heat sink at the at least one downstream component.

In addition to one or more of the features described above, or as an alternative, in further embodiments the at least one downstream component includes an environmental control system comprising a ram air circuit having at least one heat exchanger, the expanded medium being configured to absorb heat at the at least one heat exchanger.

In addition to one or more of the features described above, or as an alternative, in further embodiments including opening a valve arranged within a bypass conduit such that at least some of the medium provided from the inlet is configured to bypass the turbine.

In addition to one or more of the features described above, or as an alternative, in further embodiments including mixing the at least one of the medium that bypasses the turbine with the expanded medium downstream from the turbine outlet.

In addition to one or more of the features described above, or as an alternative, in further embodiments opening the valve occurs when the vehicle is travelling at subsonic speeds or when the vehicle is grounded.

In addition to one or more of the features described above, or as an alternative, in further embodiments the valve is closed when the vehicle is travelling at supersonic speeds.

In addition to one or more of the features described above, or as an alternative, in further embodiments including delivering energy from the generator to at leas tone load of the vehicle.

In addition to one or more of the features described above, or as an alternative, in further embodiments the vehicle is an aircraft.

BRIEF DESCRIPTION OF THE DRAWINGS

The following descriptions should not be considered limiting in any way. With reference to the accompanying drawings, like elements are numbered alike:

The FIGURE is a schematic diagram of a portion of a cooling system of a vehicle according to an embodiment.

DETAILED DESCRIPTION

A detailed description of one or more embodiments of the disclosed apparatus and method are presented herein by way of exemplification and not limitation with reference to the FIGURES.

With reference now to the FIGURE, a schematic diagram of a portion of a cooling system 20 of a vehicle is illustrated. The cooling system 20 may be a refrigeration or air cycle subsystem and is configured to receive a medium A at an inlet 22. In the illustrated, non-limiting embodiment, the medium is fresh air, such as outside air for example. This outside air, also referred to herein as RAM air, can be procured via one or more scooping mechanisms, such as an impact scoop or a flush scoop for example. When the cooling system 20 is implemented on an aircraft, the medium A is generally at an ambient pressure equal to an air pressure outside of the aircraft when the aircraft is on the ground and is between an ambient pressure and a cabin pressure when the aircraft is in flight. It should be understood that any suitable medium A is within the scope of the disclosure. For example, other suitable mediums A available on an aircraft include, but are not limited to bleed air, which is pressurized air originating from, i.e., being "bled" from, an engine or auxiliary power unit of the aircraft, or cabin discharge air, which is air leaving the cabin and that would typically be discharged overboard.

It should be understood that the elements of the cooling system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the cooling system 20 can be regulated to a desired value.

In the illustrated, non-limiting embodiment, the cooling system 20 includes a turbo-generator 24 arranged directly downstream from the inlet 22. As shown, the turbo-generator 24 includes a turbine 26 that directly drives an electric generator 28 via a shaft 30. Although the turbine 26 and the electric generator 28 are illustrated as being connected directly to the same shaft 30, it should be understood that embodiments where the generator 28 is indirectly connected to the turbine 26, such as where the generator 28 includes a separate shaft connected to the shaft 30 via a coupler are also within the scope of the disclosure. A turbine 26 is a mechanical device that expands a medium and extracts work therefrom (also referred to as extracting energy) to drive the generator 28 via the shaft 30. Accordingly, rotation of the turbine 26 extracts energy from the medium and converts it into electrical energy via the generator 28. The energy created at the generator 28 may be stored, sent to at least one load of the vehicle, illustrated schematically at 32, or alternatively, sent to an aircraft bus (not shown), where it may then be supplied to one or more electrical loads of the vehicle 10.

During operation of the cooling system 20 in a first mode when the vehicle is at a high altitude, such as during a supersonic cruise condition for example, the medium at the inlet 22 is provided to the inlet 34 of the turbine 26. Within the turbine 26, the medium A is expanded and work is extracted therefrom. The work extracted from the medium A within the turbine 26 is used to drive the generator 28. The expanded medium A1 output from the turbine 26 has a reduced temperature and pressure relative to the medium A provided to the 34 of the turbine 26. From the turbine 26, the expanded medium A1 is delivered to at least one downstream component or systems, illustrated schematically at 36. In the illustrated, non-limiting embodiment, the downstream component is an environmental control system, and the ram air may be provided to at least one heat exchanger of a ram air circuit of the environmental control system 36. However, embodiments where the ram air is provided to another component or system of the aircraft are also contemplated herein.

In an embodiment, a bypass conduit 40 extends from upstream of the turbine inlet 34 to downstream of the turbine outlet 38. In a second mode of operation, a valve V1 arranged within the bypass conduit 40 may be opened such that at least some, and in some embodiments all of the flow of medium A from the inlet 22 is configured to bypass the turbine 26 via the bypass conduit 40. In such embodiments, the medium A may be mixed with the expanded medium A1 output from the turbine 26 to control the temperature of the medium (A+A1) provided to the one or more downstream components 36. Accordingly, in the second mode of operation, the temperature of the medium provided to the downstream load may be any temperature between the temperature of the expanded medium A1 output from the turbine and the temperature of the medium A at the inlet 22. The cooling system 20 may be operable in the second mode when the vehicle or aircraft is travelling at subsonic speeds, or when the aircraft is on the ground.

As previously noted, during high speed flight, such as supersonic flight for example, the ram air temperature is elevated, thereby limiting the cooling capacity of the ram air. Inclusion of the turbo-generator 24 as illustrated and described herein is configured to reduce the temperature and pressure of the ram air so that the ram air maintains an adequate flow through the cooling system while enhancing the cooling capacity of the ram air.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooling system of an aircraft comprising:
   an inlet for receiving a medium, wherein the medium is ram air;
   a turbo-generator fluidly connected to the inlet, the turbo-generator comprising a turbine operably coupled to a generator by a shaft, the turbine having a turbine inlet and a turbine outlet, wherein the turbine inlet is fluidly coupled to the inlet;
   a bypass conduit extending from the inlet to downstream of the turbine outlet; and
   a valve associated with the bypass conduit, the valve being adjustable to control a flow through the bypass conduit;
   wherein the valve is closed when the aircraft is in supersonic flight and the valve is at least partially open when the aircraft is in subsonic flight.

2. The cooling system of claim 1, wherein the turbine is directly connected to the inlet.

3. The cooling system of claim 1, further comprising at least one downstream component fluidly coupled to the turbine outlet, wherein the medium is configured as a heat sink at the at least one downstream component.

4. The cooling system of claim 3, wherein the at least one downstream component includes an environmental control system comprising a ram air circuit having at least one heat exchanger.

5. The cooling system of claim 1, wherein the generator is electrically coupled to at least one load of the aircraft.

6. A method of operating a cooling system of an aircraft comprising:
receiving a medium at an inlet during operation of the aircraft in supersonic flight, the medium being ram air;
expanding all of the medium within a turbine to create an expanded medium that is output from a turbine outlet, the turbine being fluidly coupled to the inlet;
creating electricity at a generator in response to expanding the medium within the turbine;
receiving the medium at the inlet during operation of the aircraft in subsonic flight; and
diverting at least a portion of the medium to bypass the turbine.

7. The method of claim 6, further comprising providing the medium directly from the inlet to the turbine.

8. The method of claim 6, further comprising providing the expanded medium to at least one downstream component, the expanded medium being configured as a heat sink at the at least one downstream component.

9. The method of claim 8, wherein the at least one downstream component includes an environmental control system comprising a ram air circuit having at least one heat exchanger, the expanded medium being configured to absorb heat at the at least one heat exchanger.

10. The method of claim 6, further comprising opening a valve arranged within a bypass conduit during operation of the aircraft in subsonic flight such that at least some of the medium provided from the inlet is configured to bypass the turbine.

11. The method of claim 10, further comprising mixing the at least one of the medium that bypasses the turbine with the expanded medium downstream from the turbine outlet.

12. The method of claim 10, wherein opening the valve occurs when the aircraft is grounded.

13. The method of claim 10, further comprising closing the valve during operation of the aircraft at supersonic speeds.

14. The method of claim 6, further comprising delivering energy from the generator to at least one load of the aircraft.

* * * * *